United States Patent [19]

Dissing et al.

[11] Patent Number: 4,761,592
[45] Date of Patent: Aug. 2, 1988

[54] ELECTRIC MOTOR WITH OVERLOAD PROTECTION CIRCUIT

[75] Inventors: Bjarne Dissing, Hammel; Niels D. Jensen, Bjerringbro, both of Denmark

[73] Assignee: Grundfos International A/S, Bjerringbro, Denmark

[21] Appl. No.: 24,570

[22] Filed: Mar. 12, 1987

[30] Foreign Application Priority Data

Mar. 14, 1986 [DK] Denmark .................... 1203/86

[51] Int. Cl.$^4$ ............................................. F04B 49/00
[52] U.S. Cl. ..................................... 318/471; 318/34; 307/39; 361/170
[58] Field of Search ........................ 318/17, 41, 42, 44, 318/50, 134, 399, 401, 471, 34; 307/39, 86, 38; 417/2, 16, 17, 286, 288; 361/23, 24, 25, 26, 27, 31, 32, 166, 170

[56] References Cited

U.S. PATENT DOCUMENTS

| | | | |
|---|---|---|---|
| 2,461,076 | 2/1949 | Neeson | 417/17 X |
| 2,492,075 | 12/1949 | Atta | 417/2 |
| 2,650,337 | 8/1953 | Raver | 318/471 X |
| 2,895,088 | 7/1959 | Koenig | 361/166 |
| 2,936,107 | 5/1960 | Blackburn | 417/16 X |
| 3,147,385 | 9/1964 | Burgis | 307/38 |
| 3,332,621 | 7/1967 | Tanner | 417/2 X |
| 3,623,056 | 11/1971 | Elston | 361/25 X |
| 4,106,013 | 8/1978 | Cronin | 307/38 X |

FOREIGN PATENT DOCUMENTS

| | | |
|---|---|---|
| 0117133 | 2/1984 | European Pat. Off. |
| 0290434 | 2/1915 | Fed. Rep. of Germany |
| 0568249 | 12/1929 | Fed. Rep. of Germany |
| 0920733 | 7/1949 | Fed. Rep. of Germany |
| 3342967 | 6/1985 | Fed. Rep. of Germany |

Primary Examiner—Bentsu Ro
Attorney, Agent, or Firm—Michael N. Meller

[57] ABSTRACT

An electric motor comprising a motor overload protection such as a thermal switch and a main relay for controlling a multipolar switch in the voltage supply conductors of the motor. The thermal switch and the main relay are mounted in a control circuit in parallel with the voltage supply conductors. An auxiliary relay is coupled in parallel with the main relay and can connect an auxiliary motor via a contact arm when the thermal switch is switched off.

12 Claims, 1 Drawing Sheet

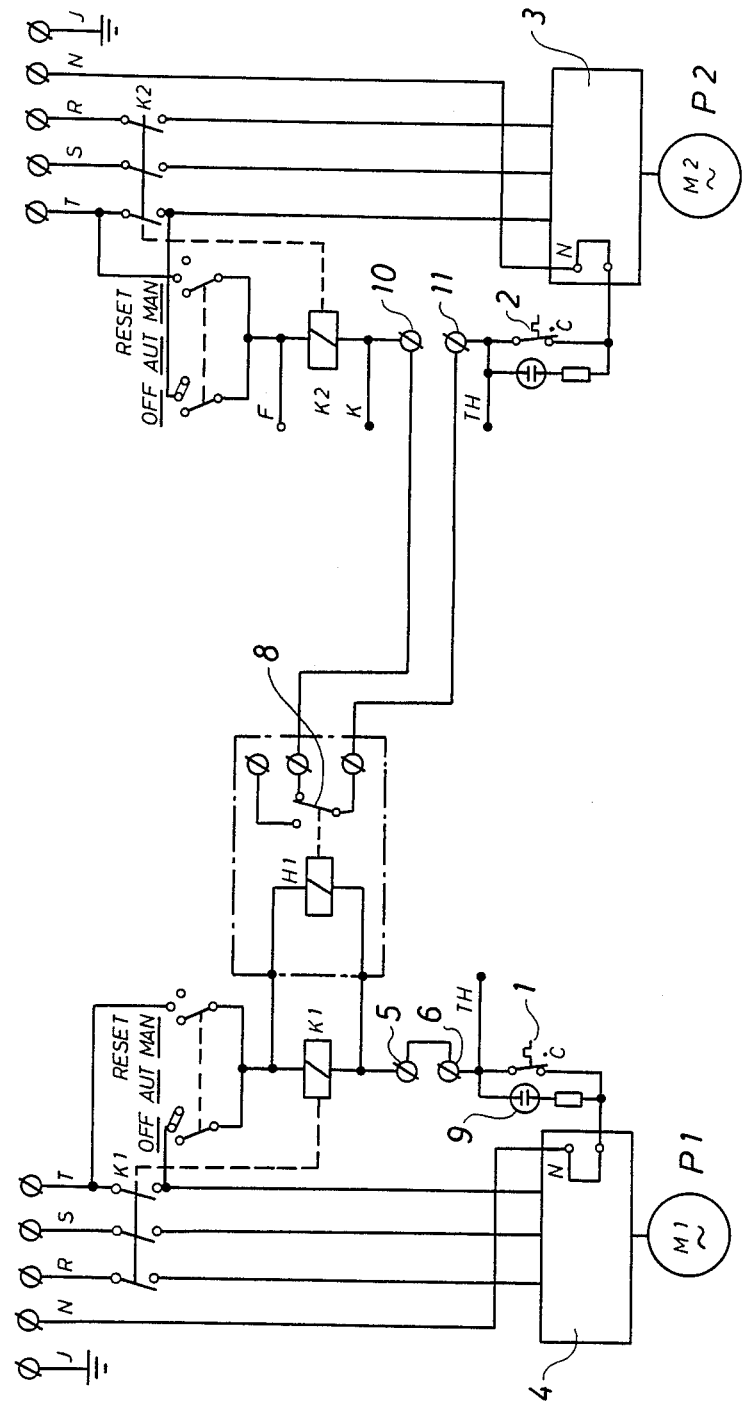

ELECTRIC MOTOR WITH OVERLOAD PROTECTION CIRCUIT

FIELD OF THE INVENTION

The invention relates to an electric motor comprising a motor overload protection circuit, such as thermal switch and a main relay for controlling a multipolar switch in the voltage supply conductors of the motor, said relay breaking the connection with the voltage supply conductors when the thermal switch is activated.

DESCRIPTION OF THE PRIOR ART

Such electric motors are used e.g. in connection with pumps, cf. e.g. German Printed Specification No. 3,342,967.

SUMMARY OF THE INVENTION

An electric motor of the above kind is according to the invention characterized in that it comprises an auxiliary relay which can connect an auxiliary motor when the thermal switch is activated, said main relay and said auxiliary relay being mounted in a terminal box for the electric motor. The auxiliary relay can be coupled in parallel with the main relay, the parallel connected relays being arranged in series with the thermal switch and the series connection of the relays and the thermal switch being connected to one phase of the voltage supply conductors and ground, respectively. The auxiliary motor is coupled similarly and an external control such as a relay control can be inserted in the aforementioned series connection by means of the auxiliary relay.

BRIEF DESCRIPTION OF THE DRAWING

The invention is described in detail in the following with reference to the accompanying drawing, which shows a switch circuit in connection with a main pump and an auxiliary pump.

DESCRIPTION OF THE PREFERRED EMBODIMENT

P1 is a main pump in e.g. a water supply pipe. The main pump P1 is actuated by means of a three-phase electric motor M1. P2 is an auxiliary pump actuated by another three-phase electric motor M2. The voltage supply conductors RST of the motor M1 comprise a relay-controlled three-phased switch. A control circuit in parallel with the voltage supply conductors RST comprises a thermal switch 1, two terminals 5, 6 for external control, a main relay K1 and a switch. The relay K1 serves to control the three-phased switch in the voltage supply conductors RST, said relay K1 breaking the connection with the voltage supply conductors when a current flows through the relay coil. An auxiliary relay H1, mounted parallel with the main relay K1, can connect an auxiliary motor M2 via a contact arm 8 when the thermal switch 1 is switched off and disconnects the control circuit. The thermal switch 1 can e.g. be a bimetallic part mounted near the windings of the motor and being thermally connected with these. A resistance and a lamp 9, indicating whether or not the thermal switch 1 is switched off, are mounted in parallel with the thermal switch 1.

The motor M1 can be automatically or manually switched off by means of the switch. When setting the switch on automatic, the auxiliary pump P2 will start automatically if the thermal switch 1 falls out and the pump P2 will go on until P1 is re-started manually. The supply conductors RST can optionally comprise a speed control module 4.

The pump motor M2 is coupled in exactly the same way as M1, a control circuit being mounted in connection with the auxiliary motor M2 and comprising a thermal switch 2, a relay K2 and a switch, the relay K2 controlling a three-phased switch in the voltage supply conductors RST. The control arm 8 of the auxiliary relay H1 is connected to the terminals 10, 11 for external control of the control circuit for M2.

The terminal box is applicable to motors of different sizes and can furthermore be modified in many ways without departing from the scope of the invention.

We claim:

1. An electric motor comprising a motor overload protection circuit and a main relay for controlling a multipolar switch in the voltage supply conductors of the motor, said main relay breaking the connection with the voltage supply conductors when the protection circuit is activated, and further comprising an auxiliary relay for controlling an auxiliary motor when the protection circuit is activated, said main relay and said auxiliary relay being mounted in a terminal box for the electric motor and said auxiliary relay being connected in parallel with the main relay.

2. An electric motor as claimed in claim 1, wherein the parallel connected relays are connected in series with the protection circuit.

3. An electric motor as claimed in claim 2, wherein the series connection of the relays and the protection circuit is connected to one phase of the voltage supply conductors and ground, respectively.

4. An electric motor as claimed in claim 2 wherein an external control means is insertable in said series connection.

5. An electric motor as claimed in claim 4, wherein said external control means comprises a relay control.

6. An electric motor as claimed in claim 1, wherein the auxiliary motor comprises a corresponding main relay for controlling a multipolar switch in the voltage supply conductors of the auxiliary motor.

7. An electric motor as claimed in claim 6, further comprising a thermal switch connected in series with the main relay of the auxiliary motor.

8. An electric motor as claimed in claim 7, wherein the series connection of the relay and the thermal switch of the auxiliary motor are connected to one phase of the voltage supply conductors and ground, respectively.

9. An electric motor as claimed in claim 7, wherein an external control means is insertable in said series connection.

10. An electric motor as claimed in claim 9, wherein said external control means comprises a relay control.

11. An electric motor as claimed in claim 7, wherein the auxiliary motor comprises a speed control module.

12. An electric motor as claimed in claim 1, wherein said protection circuit comprises a thermal switch.

* * * * *